US012618265B2

(12) United States Patent
Akiyama et al.

(10) Patent No.: US 12,618,265 B2
(45) Date of Patent: May 5, 2026

(54) CYLINDER LOCK AND DOOR

(71) Applicant: LIXIL Corporation, Tokyo (JP)

(72) Inventors: Fuminori Akiyama, Tokyo (JP); Takashi Mitsuhashi, Tokyo (JP)

(73) Assignee: LIXIL Corporation, Tokyo (JP)

( * ) Notice: Subject to any disclaimer, the term of this patent is extended or adjusted under 35 U.S.C. 154(b) by 11 days.

(21) Appl. No.: 18/715,269

(22) PCT Filed: Nov. 28, 2022

(86) PCT No.: PCT/JP2022/043707
§ 371 (c)(1),
(2) Date: May 31, 2024

(87) PCT Pub. No.: WO2023/100787
PCT Pub. Date: Jun. 8, 2023

(65) Prior Publication Data
US 2025/0027337 A1 Jan. 23, 2025

(30) Foreign Application Priority Data
Dec. 1, 2021 (JP) ................................ 2021-195253

(51) Int. Cl.
*E05B 27/00* (2006.01)

(52) U.S. Cl.
CPC ................................ *E05B 27/0017* (2013.01)

(58) Field of Classification Search
CPC ............... E05B 27/0017; E05B 27/001; E05B 27/0014; Y10T 70/7588; Y10T 70/7599; Y10T 70/7605
USPC ........................................................... 70/357
See application file for complete search history.

(56) References Cited

U.S. PATENT DOCUMENTS 2,059,129 A * 10/1936 Maxwell ............. E05B 15/1614 70/378
2,111,098 A * 3/1938 Segal .................... E05B 27/001 70/378
2,283,489 A * 5/1942 Crousore .............. E05B 27/006 70/378
2,687,640 A * 8/1954 Mir ......................... E05B 27/00 70/378
(Continued)

FOREIGN PATENT DOCUMENTS

GB 2453623 A * 4/2009 ......... E05B 27/0021
GB 2506580 B * 5/2017 ......... E05B 27/0057
GB 2619522 A * 12/2023 ......... E05B 27/0017
(Continued)

*Primary Examiner* — Suzanne L Barrett
(74) *Attorney, Agent, or Firm* — Morrison & Foerster LLP

(57) ABSTRACT

A cylinder lock is disclosed that is capable of preventing a driver pin from falling over inside a pin hole even when the driver pin has been shortened. The cylinder lock comprises an outer cylinder and an inner cylinder that rotatably fits into the outer cylinder. The outer cylinder and the inner cylinder each have a hole formed therein which connects to a key hole and into which the driver pin can be inserted. The diameter of the outer cylinder side of the driver pin is greater than the diameter of the inner cylinder side of the driver pin. An orientation-maintaining region having a prescribed length in the axial direction and a fixed diameter is preferably provided at the outer cylinder-side end of the driver pin.

9 Claims, 7 Drawing Sheets

(56) References Cited

U.S. PATENT DOCUMENTS

| | | | | | |
|---|---|---|---|---|---|
| 3,590,615 | A * | 7/1971 | Schultz | E05B 27/0064 70/358 |
| 4,341,102 | A * | 7/1982 | Ku | E05B 27/0042 70/358 |

FOREIGN PATENT DOCUMENTS

| | | | | |
|---|---|---|---|---|
| JP | H9-170363 A | 6/1997 | | |
| JP | 2007-239265 A | 9/2007 | | |
| JP | 2008-144522 A | 6/2008 | | |
| WO | WO-2005068756 A1 * | 7/2005 | | E05B 27/0021 |
| WO | WO-2008050464 A1 * | 5/2008 | | E05B 27/0064 |

* cited by examiner

CYLINDER LOCK AND DOOR

CROSS-REFERENCE TO RELATED APPLICATIONS

This application is a national stage application under 35 USC 371 of International Application No. PCT/JP2022/043707, filed Nov. 28, 2022, which claims the priority of Japanese Application No. 2021-195253, filed Dec. 1, 2021. The entire contents of each priority application are incorporated herein by reference.

FIELD OF THE DISCLOSURE

The present disclosure relates to cylinder locks and doors.

BACKGROUND OF THE DISCLOSURE

Conventionally, cylinder locks installed in residential doors and similar applications are known. A cylinder lock includes an outer cylinder, an inner cylinder rotatably engaging with the outer cylinder, a driver pin that restricts the rotation of the inner cylinder, and a tumbler pin.

The unlocking key corresponding to the cylinder lock includes protrusions and indentations formed in portions contacting the tumbler pin. When the unlocking key is inserted into the keyhole of the cylinder lock, and the contact surfaces of the driver pin and the tumbler pin are aligned with the shear line being the outer peripheral surface of the inner cylinder, the inner cylinder becomes rotatable (for example, refer to Japanese Unexamined Patent Application, Publication No. H9-170363). This enables the locking and unlocking of the cylinder lock.

SUMMARY OF THE DISCLOSURE

Problems to be Solved by the Invention

In order to downsize the cylinder lock for space-saving and cost reduction purposes, the total length of the driver pin needs to be shortened. Meanwhile, a certain clearance is provided between the driver pin and the pinhole of the outer cylinder that accommodates the driver pin. Therefore, simply shortening the total length of the driver pin may cause the driver pin to topple over inside the pinhole. One approach to avoiding this situation may be to narrow the clearance between the driver pin and the pinhole. However, with this approach, the driver pin could not be inserted into the pinhole of the inner cylinder due to misalignment between the pinhole of the outer cylinder and the pinhole of the inner cylinder. Since the inner cylinder is rotatably fixed to the outer cylinder, it is impossible to completely eliminate the misalignment between the pinhole of the outer cylinder and the pinhole of the inner cylinder.

The present disclosure has been made in light of the above, and aims to provide a cylinder lock that can prevent the driver pin from toppling over inside the pinhole, even when the driver pin is shortened.

Means for Solving the Problems

The present disclosure relates to a cylinder lock including an outer cylinder and an inner cylinder that rotatably engages with the outer cylinder, in which holes are formed in the outer and inner cylinders, the holes communicate with the keyhole, the driver pin can be inserted into the holes, and the diameter of the driver pin on the outer cylinder side is larger than the diameter of the driver pin on the inner cylinder side.

DETAILED DESCRIPTION OF THE DISCLOSURE

Cylinder Lock

Figure 1:
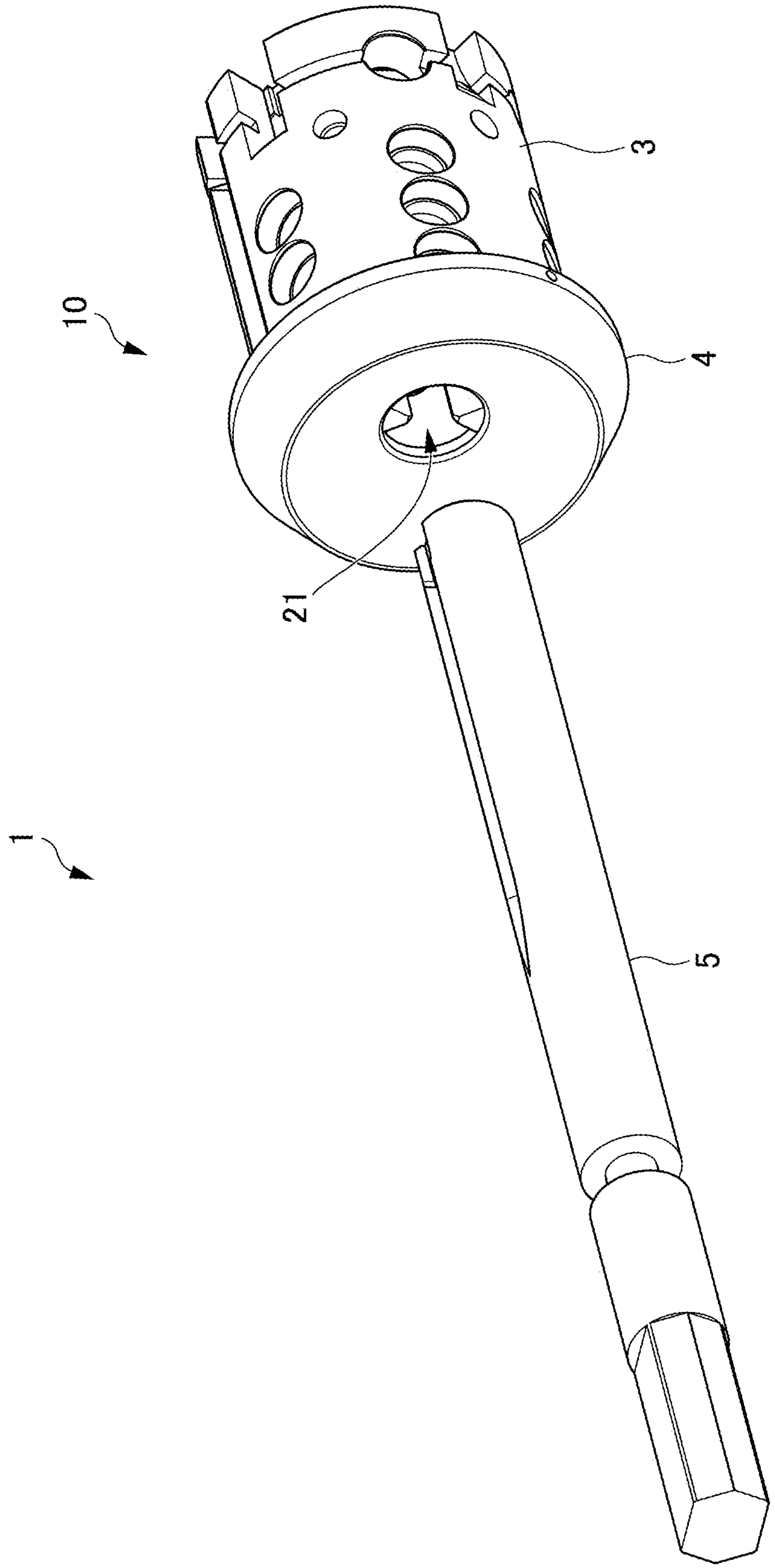
FIG. 1 is a perspective view illustrating a configuration of a cylinder lock according to the present embodiment.
Figure 2:
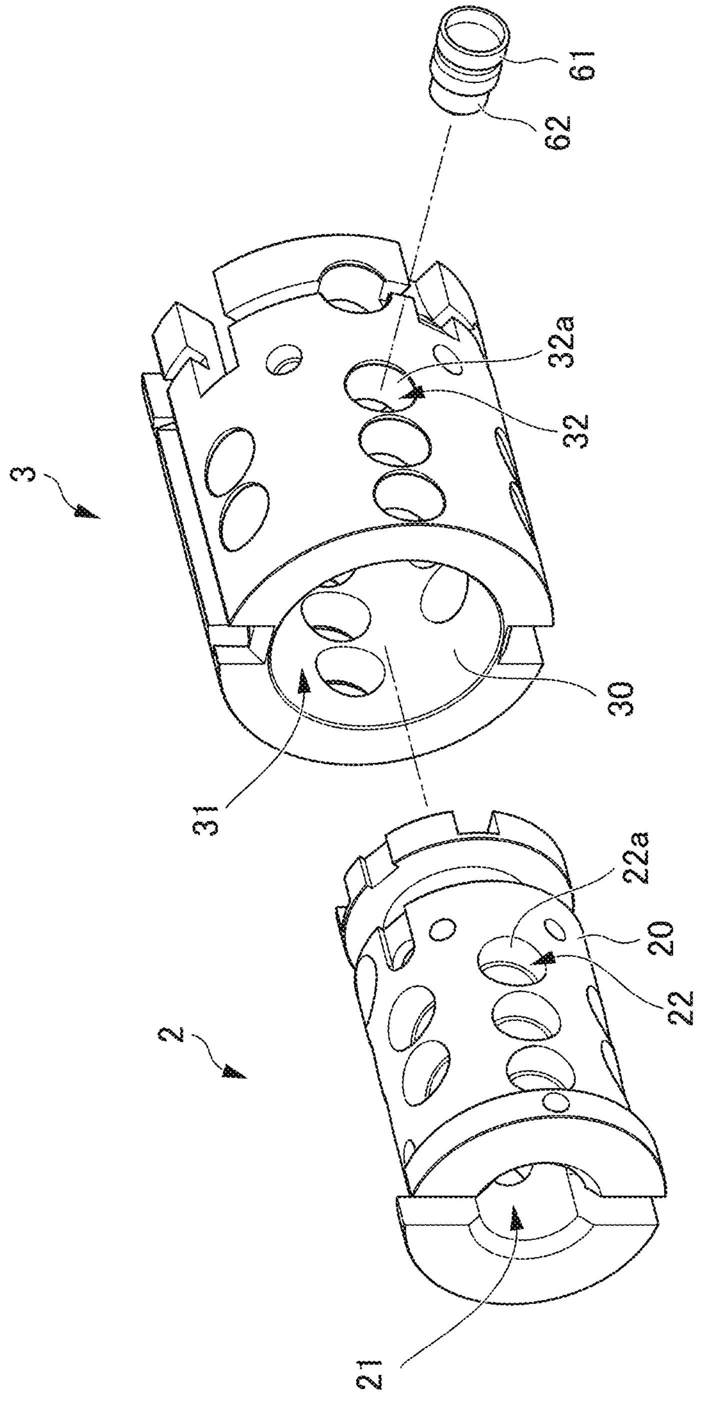
FIG. 2 is an exploded perspective view illustrating the configuration of the cylinder lock according to the present embodiment.

As illustrated in FIG. 1, a cylinder lock 10 according to the present embodiment is used in conjunction with an unlocking key 5 capable of locking and unlocking the cylinder lock 10 in a locking device 1. As illustrated in FIGS. 1 and 2, the cylinder lock 10 includes an inner cylinder 2, an outer cylinder 3, a decorative member 4, a driver pin 61, and a tumbler pin 62. The inner cylinder 2 rotatably engages with the fixed outer cylinder 3.

Inner Cylinder

As illustrated in FIG. 2, the inner cylinder 2 is a substantially cylindrical member that rotatably engages with the outer cylinder 3. The material for the inner cylinder 2 is not particularly limited, and may be composed of metal such as brass, for example. An outer peripheral surface 20 being the sliding surface of the inner cylinder 2 contacts an inner peripheral surface 30 of the outer cylinder 3, and engages with the outer cylinder 3. A keyhole 21, into which the unlocking key 5 can be inserted, is formed in the inner cylinder 2 along the axial direction of the inner cylinder 2.

As illustrated in FIG. 2, a plurality of pinholes 22 communicating with the keyhole 21 are formed in the outer peripheral surface 20 of the inner cylinder 2. At least part of the driver pin 61 and the tumbler pin 62 can be inserted into and removed from the plurality of pinholes 22. Each of the pinholes 22 has a cylindrical inner peripheral surface **22*a*. In the present embodiment, a plurality of rows of pinholes 22 are formed along the axial direction of the inner cylinder 2, and a plurality of pairs of pinholes 22 are formed in the circumferential direction of the inner cylinder 2**.

Figure 4:
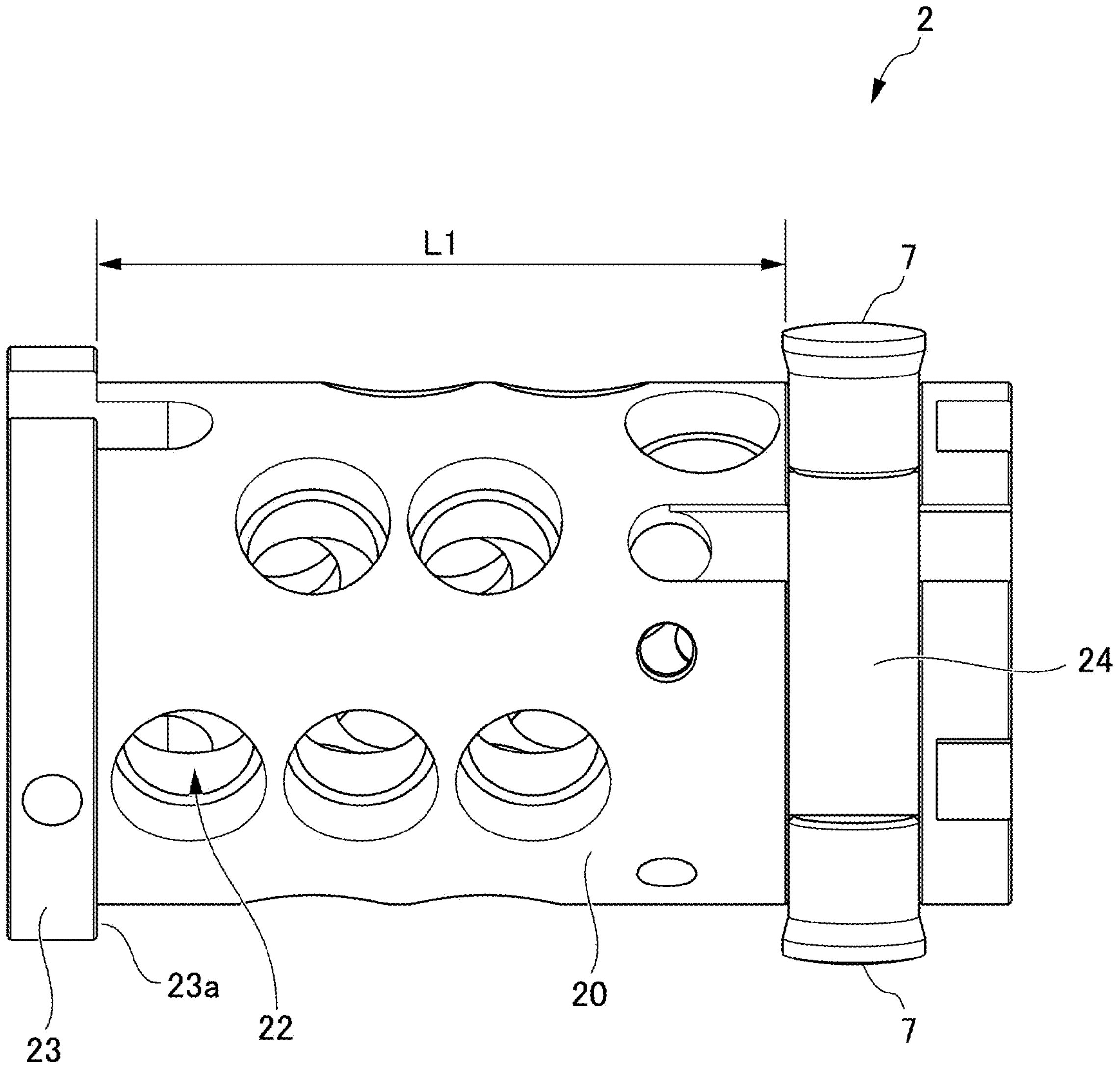
FIG. 4 is a side view of an inner cylinder according to the present embodiment.

As illustrated in FIG. 4, a flange 23 is provided on the end face of the inner cylinder 2, on the side of inserting the unlocking key 5. The flange 23 may be formed integrally with the inner cylinder 2 or may be a component separate from the inner cylinder 2. A groove 24, with which a pair of fixing pins 7 can engage, is provided near the end face of the inner cylinder 2, opposite to the side of inserting the unlocking key 5. In the present embodiment, the groove 24 is provided along the circumferential direction of the inner cylinder 2. As illustrated in FIG. 4, an indentation having a length L1 in a side view is formed between the flange 23 and the fixing pins 7 engaging with the groove 24. Part of the outer cylinder 3 engages with indentation, whereby the inner cylinder 2 rotatably engages with the outer cylinder 3. The state of engagement between the inner cylinder 2 and the outer cylinder 3 will be described later in detail.

Outer Cylinder

As illustrated in FIG. 2, the outer cylinder 3 is a substantially cylindrical member, in which the inner cylinder 2 can engage with holes 31 formed inside the outer cylinder 3. The material for the outer cylinder 3 is not particularly limited, and may be composed of metal such as brass, for example, as in the case of the inner cylinder 2. The outer cylinder 3 is fixed and non-rotatable. The inner peripheral surface 30 being the sliding surface of the outer cylinder 3 contacts the outer peripheral surface 20 of the inner cylinder 2 and engages with the inner cylinder 2.

The holes 31, with which the inner cylinder 2 can engage, are formed in the outer cylinder 3 along the axial direction of the outer cylinder 3. A plurality of pinholes 32 communicating with the holes 31 are formed in the outer peripheral surface of the outer cylinder 3. At least part of the driver pin 61 and the tumbler pin 62 can be inserted into and removed from the plurality of pinholes 32. Each of the plurality of pinholes 32 has a cylindrical inner peripheral surface 32*a*. The plurality of pinholes 22 and 32 communicate with each other such that at least part of the driver pin 61 and the tumbler pin 62 are insertable and removable when the inner cylinder 2 rotates to a predetermined position relative to the outer cylinder 3.

Figure 5:
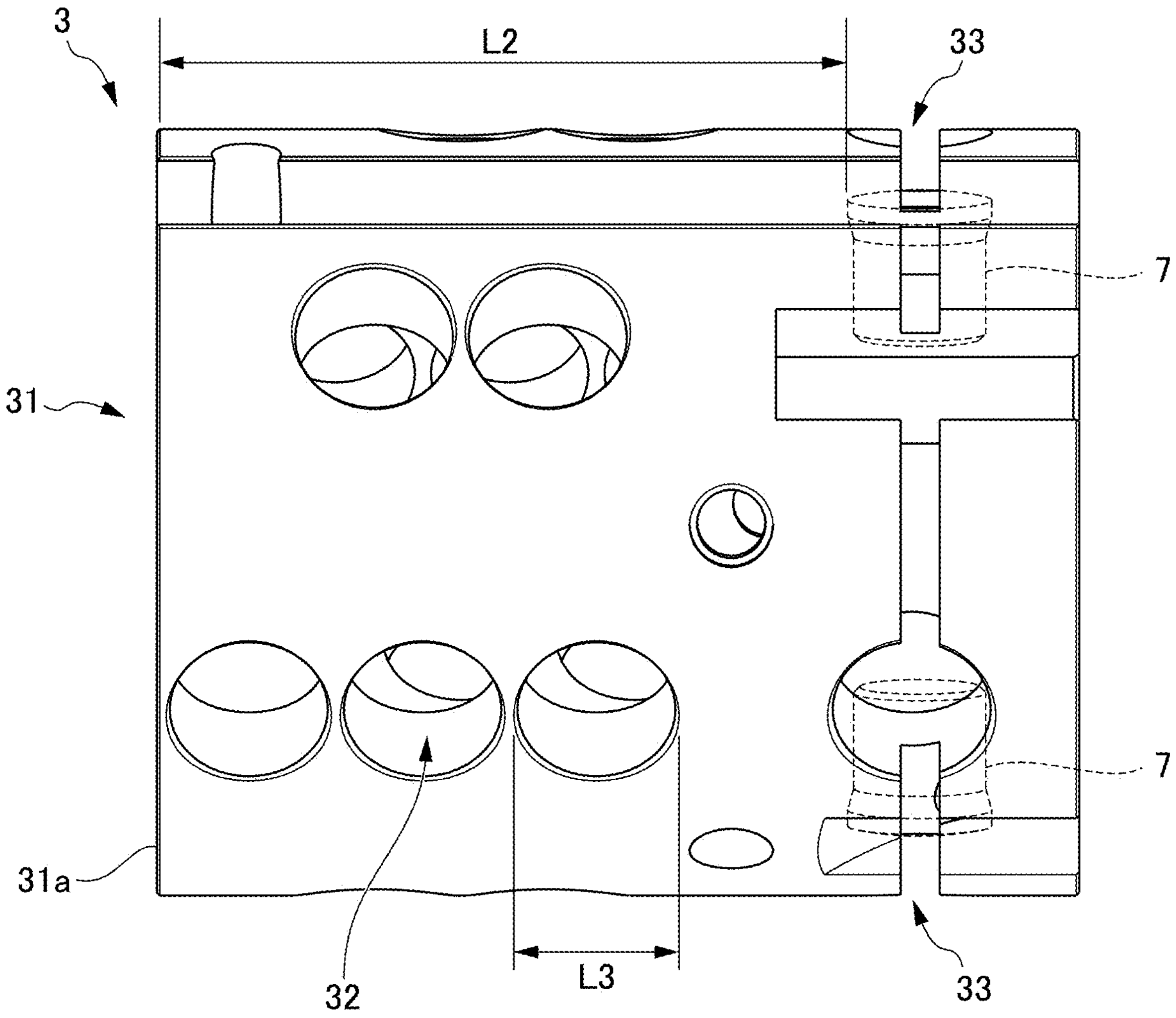
FIG. 5 is a side view of an outer cylinder according to the present embodiment.

As illustrated in FIG. 5, a pair of holes 33, through which a pair of fixing pins 7 can be inserted, respectively, are formed in the outer peripheral surface of the outer cylinder 3. The holes 33 communicate with the holes 31, as in the case of the pinholes 32. The holes 33 are provided near the end face opposite to the end face 31*a* of the outer cylinder 3, as illustrated in FIG. 5.

The state of engagement between the inner cylinder 2 and the outer cylinder 3 is described below. In the positional relationship illustrated in FIG. 2, when the outer cylinder 3 is inserted from the end face side of the inner cylinder 2, which is opposite to the end face including the flange 23, the end face 31*a* of the outer cylinder 3 illustrated in FIG. 5 contacts the inner end face 23*a* of the flange 23. In this state, when the pair of fixing pins 7 are inserted into the holes 33, the pair of fixing pins 7 engage with the groove 24 formed in the inner cylinder 2, as illustrated in FIG. 4. As a result, the inner cylinder 2 engages with the outer cylinder 3. At this time, the inner cylinder 2 needs to be rotatable relative to the outer cylinder 3. Therefore, in the state where the fixing pins 7 are inserted into the outer cylinder 3 as illustrated in FIG. 5, the length L2 between the end face 31*a* and the edge of the fixing pins 7 is slightly smaller than the length L1 of the indentation, providing a clearance only by the difference between L1 and L2. Therefore, when the inner cylinder 2 engages with the outer cylinder 3, and the unlocking key 5 is inserted into and removed from the keyhole 21, the clearance may cause misalignment between the pinholes 22 and 32.

Decorative Member

As illustrated in FIG. 1, the decorative member 4 covers and decorates the front face of the cylinder lock 10, which is the face on the keyhole 21 side of the inner cylinder 2 and the outer cylinder 3. The decorative member 4 includes a hole communicating with the keyhole 21. The material for the decorative member 4 is not particularly limited and may be composed of metal or the like. A plated layer or the like for enhancing the design may be formed on the surface of the decorative member 4. The decorative member 4 makes the inner cylinder 2 and the outer cylinder 3 almost invisible from the outside. Instead of the decorative member 4, at least the front part of the inner cylinder 2 and the outer cylinder 3 may be decorated, for example, with a plated layer.

Driver Pin, Tumbler Pin

Figure 6:
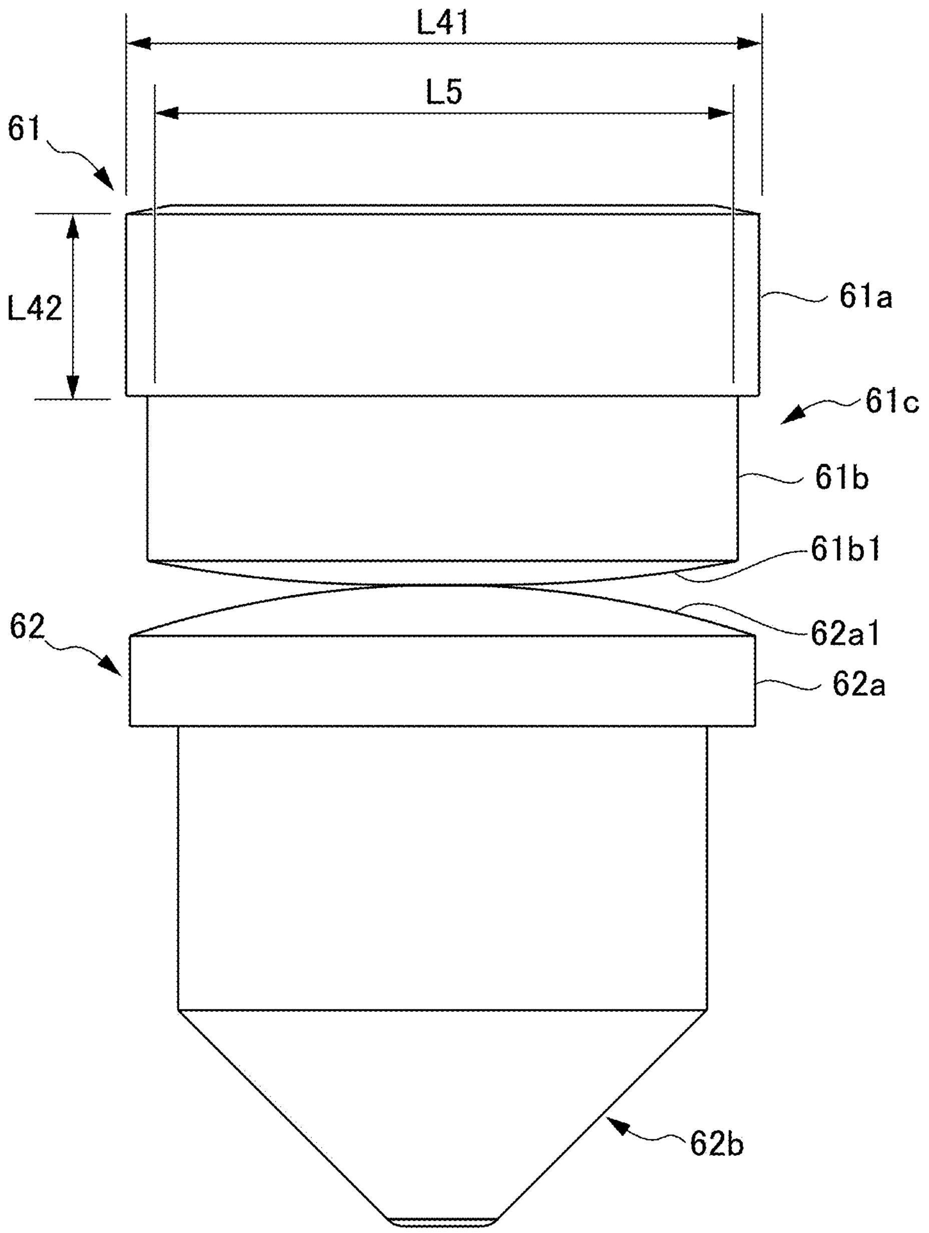
FIG. 6 is a front view of a driver pin and a tumbler pin according to the present embodiment.

The driver pins 61 and the tumbler pins 62 are members that have a substantially circular columnar shape and are slidably accommodated in the pin holes 22 and 32. The tumbler pin 62 is arranged on the keyhole 21 side, has a rounded tip 62*b* that contacts the unlocking key 5, and has an enlarged-diameter part 62*a* at the edge that contacts the driver pin 61, as illustrated in FIG. 6. The driver pin 61 has an edge that contacts the tumbler pin 62, and another edge that contacts an urging member (not illustrated). Although FIG. 2 illustrates only one pair of driver pins 61 and one pair of tumbler pins 62 for simplicity, there are a plurality of pairs of driver pins 61 and tumbler pins 62, which are accommodated in the plurality of pairs of pinholes 22 and 32.

In the present embodiment, six rows of driver pins 61 and tumbler pins 62 are arranged in the axial direction of the circular keyhole 21. The rows of the driver pins 61 and tumbler pins 62 arranged in the axial direction of the keyhole 21 are not limited to six rows, and can be any number of rows such as three or more rows, for example.

As illustrated in FIG. 6, a tapered part 61*b*1 of the driver pin 61 contacts a tapered part 62*al* of the tumbler pin 62, thus the driver pin 61 contacts the tumbler pin 62. In the present embodiment, since the inner cylinder 2 and the outer cylinder 3 are substantially cylindrical, a shear line SL runs along the outer peripheral surface 20 of the inner cylinder 2 (the inner peripheral surface 30 of the outer cylinder 3). Therefore, if the contact portion between the driver pin 61 and the tumbler pin 62 were made flat, the opening between the contact portions would not align with the shear line SL, thus the inner cylinder 2 could not rotate in synchrony with the unlocking key 5. Therefore, by providing the tapered parts at the contact portion between the driver pin 61 and the tumbler pin 62, the inner cylinder 2 can rotate in synchrony with the unlocking key 5. In the present embodiment, the top of the tapered part 61*b*1 and the top of the tapered part 62*al* are partially flat.

Driver Pin

Figure 3:
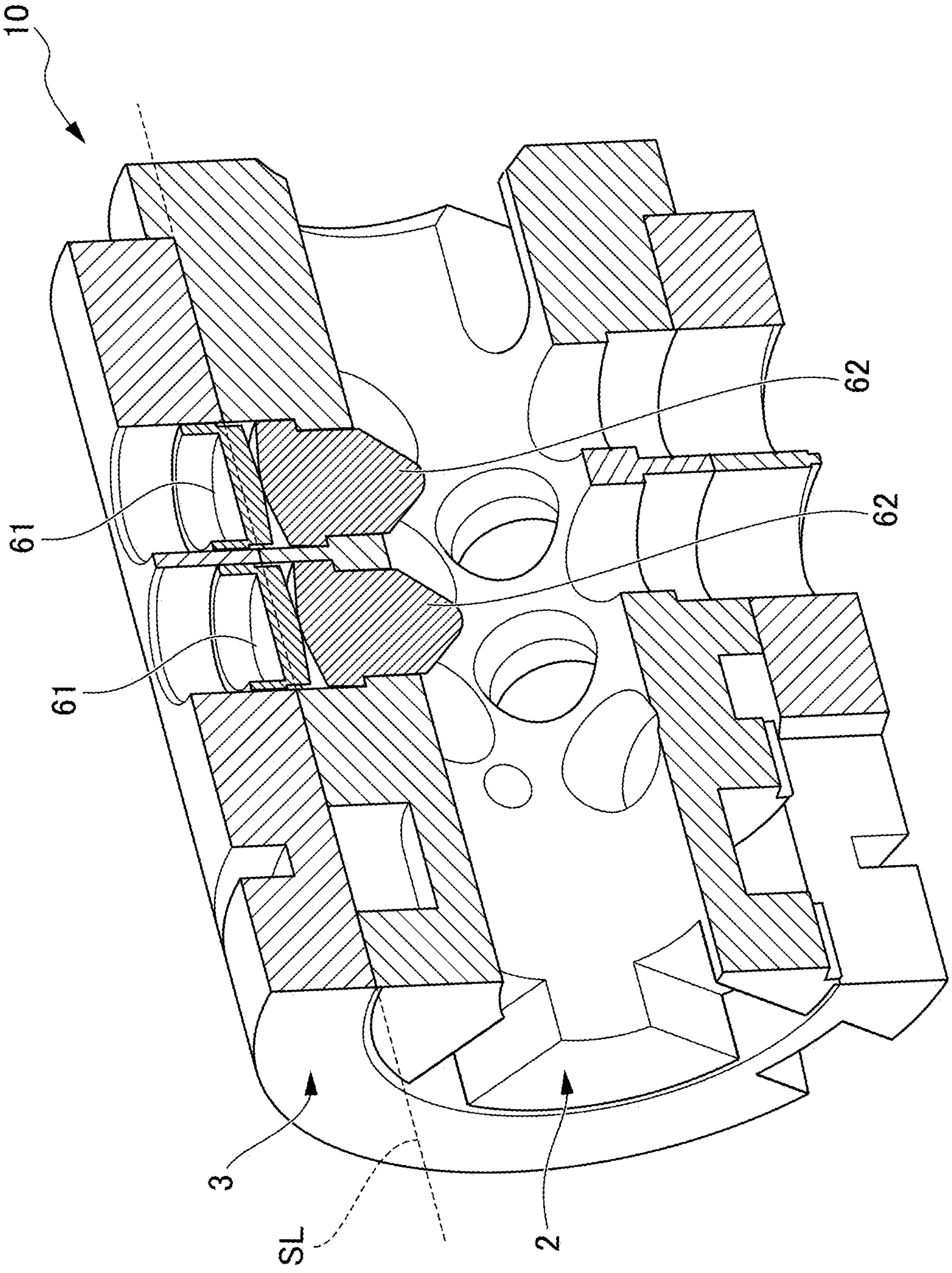
FIG. 3 is a cross-sectional perspective view illustrating the configuration of the cylinder lock according to the present embodiment.

An urging member (not illustrated) urges the driver pin 61 towards the keyhole 21. As illustrated in FIG. 3, when the unlocking key 5 is not inserted into the keyhole 21, the driver pin 61 is positioned between the inner cylinder 2 and the outer cylinder 3, thus restricting the rotation of the inner cylinder 2. In the state where the unlocking key 5 is inserted into the keyhole 21, the lengths of the driver pin 61 and the tumbler pin 62 are set, and the indentations and protrusions formed on the surface of the unlocking key 5 are set, such that the opening between the contact surfaces of the driver pin 61 and the tumbler pin 62 aligns with the shear line SL being the contact surfaces of the inner cylinder 2 and the outer cylinder 3. By rotating the unlocking key 5 in the state where the opening between contact surfaces of the driver pin 61 and the tumbler pin 62 aligns with the shear line SL, the inner cylinder 2 rotates in synchrony with the unlocking key 5. As a result, for example, the deadbolt of the door can be pulled out or retracted, thereby enabling the locking and unlocking of the cylinder lock 10.

As illustrated in FIG. 6, the diameter L41 of the driver pin 61 near the outer cylinder 3 is larger than the diameter L5 of the driver pin 61 near the inner cylinder 2. Since the clearance between the diameter L41 and the diameter L3 of the pinhole 32 is reduced from the conventional cases, the driver pin 61 can be prevented from toppling over inside the pinhole 32, even when the total length of the driver pin 61 is shortened. Here, a case is described in which the diameter of the driver pin 61 is maintained constant, and the clearance between the diameter L41 and the diameter L3 of the pinhole 32 is reduced from the conventional cases. In this case, although the driver pin 61 can be prevented from toppling over inside the pinhole 32, the driver pin 61 accommodated in the pinhole 32 may not be insertable into the pinhole 22 due to misalignment between the pinholes 22 and 32. However, in the present disclosure, since the diameter L5 of the driver pin 61 near the inner cylinder 2 is smaller than the diameter L41 of the driver pin 61 near the outer cylinder 3, the driver pin 61 can be inserted into the pinhole 22, while achieving the effect of preventing the toppling.

In the present embodiment, the driver pin 61 includes a posture maintaining region 61*a* and a communication region 61*b*. The posture maintaining region 61*a* is arranged on the outer cylinder 3 side, and the communication region 61*b* is arranged on the inner cylinder 2 side.

As illustrated in FIG. 6, the posture maintaining region 61*a* preferably has a substantially rectangular shape in a side view, and has a constant diameter L41 over a certain length L42 in the axial direction from the edge of the driver pin 61 on the outer cylinder 3 side. That is, a step 61*c* is preferably provided between the posture maintaining region 61*a* and the communication region 61*b*. As a result, the driver pin 61 can be effectively prevented from toppling over inside the pinhole 32. Alternatively, the posture maintaining region 61*a* may have a tapered shape, in which the driver pin 61 has the largest diameter at the edge of on the outer cylinder 3 side and gradually decreases in diameter towards the inner cylinder 2 side.

In the case in which the posture maintaining region 61*a* has the constant diameter L41 over the certain length L42 in the axial direction from the edge of the driver pin 61 on the outer cylinder 3 side, the ratio of the axial length L42 to the diameter L41, which is the axial length/diameter ratio of the posture maintaining region 61*a*, is preferably 0.3 or more. As a result, the driver pin 61 can be prevented from toppling over inside the pinhole 32, and the total length of the driver pin 61 can be shortened. From the perspective of reliably preventing the driver pin 61 from toppling over inside the pinhole 32, the axial length/diameter ratio is preferably 0.5 or more.

The communication region 61*b* has a constant diameter L5 over a certain length in the axial direction from the edge of the driver pin 61 on the inner cylinder 2 side. The diameter L5 of the communication region 61*b* is smaller than the diameter L41 of the posture maintaining region 61*a*. When the unlocking key 5 is inserted into and removed from the keyhole 21, the communication region 61*b* enables the driver pin 61 to be inserted into the pinhole 22, even when misalignment arises between the pinholes 22 and 32.

When the diameter L41 of the posture maintaining region 61*a* is almost equal to the diameter L3 of the pinhole 32, the difference between the diameter L41 of the posture maintaining region 61*a* and the diameter L5 of the communication region 61*b* is preferably at least as large as the difference between L1 and L2, corresponding to the clearance between the inner cylinder 2 and the outer cylinder 3. This clearance corresponds to the maximum value of misalignment between the pinholes 22 and 32. Therefore, by setting the difference between L5 and L41 at least as large as this clearance, the communication region 61*b* can be inserted into the pinhole 22, even when misalignment arises between the pinholes 22 and 32.

The posture maintaining region 61*a* and the communication region 61*b* may be formed as separate components, but are preferably formed integrally from the perspective of ensuring machining accuracy.

Unlocking Key

The unlocking key 5 can lock and unlock the cylinder lock 10. In the present embodiment, the insertion part of the unlocking key 5 into the keyhole 21 has a circular columnar shape. FIG. 1 illustrates the unlocking key 5 as a blank key. When the unlocking key 5 is actually applied to the cylinder lock 10, indentations corresponding to the length and arrangement of the driver pins 61 and the tumbler pins 62 of the cylinder lock 10 are formed on the outer peripheral surface of the insertion part.

Door

Figure 7:
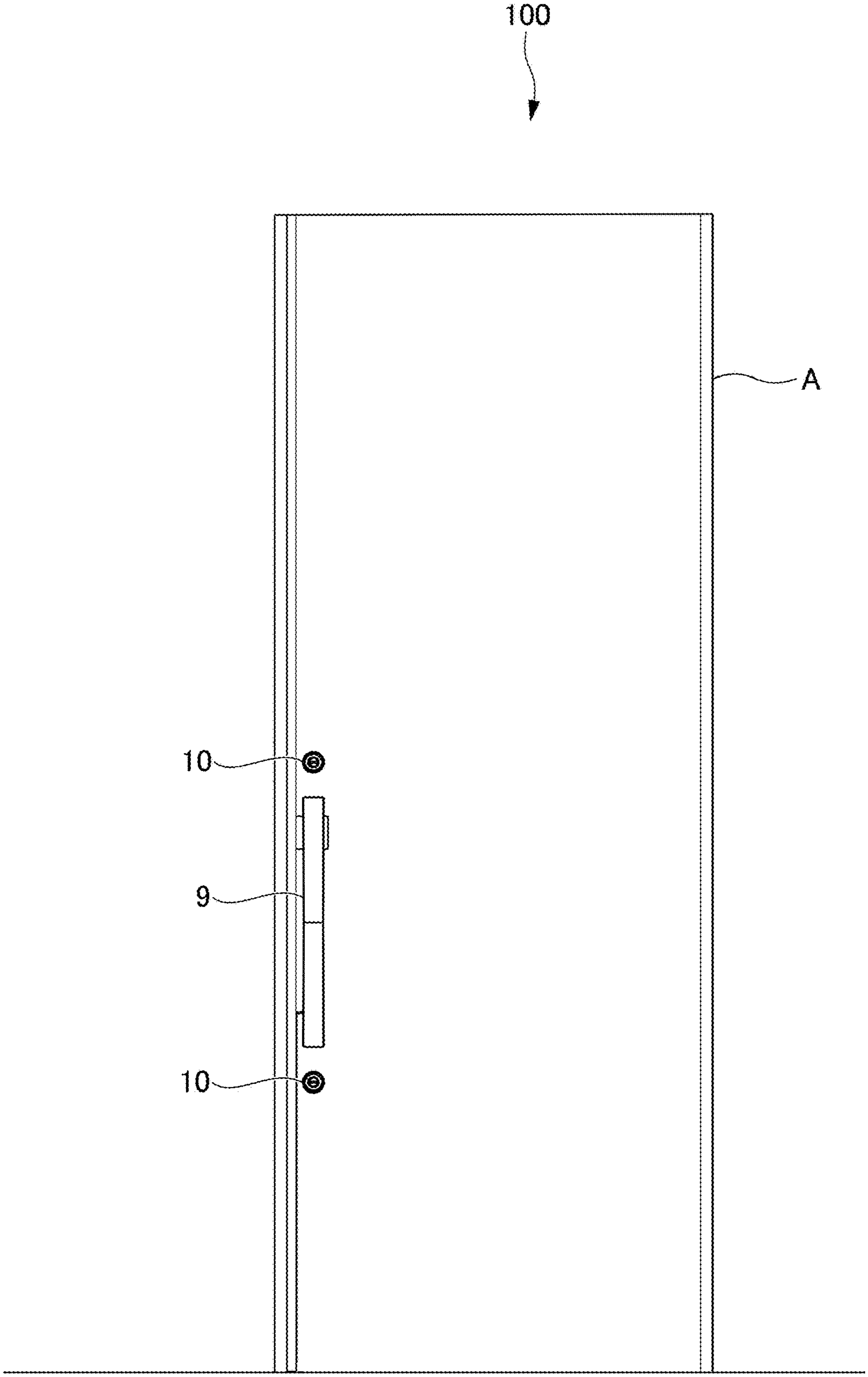
FIG. 7 is a front view of a door equipped with the cylinder lock according to the present embodiment.

As illustrated in FIG. 7, a door 100 according to the present embodiment is installed so as to be openable and closable, in a door opening A of a building structure. On the door front side, the door 100 includes a handle 9 for opening and closing the door 100, and a pair of cylinder locks 10 arranged above and below the handle 9. The door 100 is used, for example, as a front door.

The cylinder lock and the door according to the embodiment of the present disclosure have been described above. However, the present disclosure is not limited to the embodiments and can be modified as appropriate.

In the embodiment described above, the communication region 61*b* has the constant diameter L5 over a certain length in the axial direction from the edge of the driver pin 61 on the inner cylinder 2 side. This is a non-limiting example. The communication region 61*b* may have varying diameters in the axial direction, by having a tapered shape, for example.

The invention claimed is:

1. A cylinder lock, comprising:

an outer cylinder; and an inner cylinder rotatably engaging with the outer cylinder, wherein a hole is formed in the outer cylinder and the inner cylinder, in which the hole communicates with a keyhole, and a driver pin and a tumbler pin can be inserted through the hole, the driver pin includes a posture maintaining region on a side of the outer cylinder, the driver pin includes a communication region on a side of the inner cylinder, a diameter of the posture maintaining region is larger than a diameter of the communication region, a sum of an axial length of the driver pin and an axial length of the tumbler pin is not more than twice the diameter of the posture maintaining region, and the diameter of the posture maintaining region is substantially equal to a hole diameter of the hole formed in the outer cylinder.

2. The cylinder lock of claim 1, wherein the driver pin includes:

a step between the posture maintaining region and the communication region.

3. The cylinder lock of claim 2, wherein an axial length/diameter ratio, which is a ratio of an axial length of the posture maintaining region to the diameter of the posture maintaining region, is 0.3 or more.

4. The cylinder lock of claim 1, wherein a length L2 of a portion where the outer cylinder engages with the inner cylinder is shorter than a length L1 of a portion where the inner cylinder engages with the outer cylinder, forming a clearance corresponding to a difference between L1 and L2, and a difference between the diameter of the driver pin on the side of the outer cylinder and the diameter of the driver pin on the side of the inner cylinder is a length of at least as long as the clearance.

5. A door comprising the cylinder lock of claim 1.

6. The cylinder lock of claim 1, wherein the diameter of the posture maintaining region is constant over a certain length in an axial direction from an edge of the driver pin on the side of the outer cylinder.

7. The cylinder lock of claim 1, wherein the posture maintaining region includes a region which varies in diameter in an axial direction and in which the driver pin has a larger diameter at an edge on the side of the outer cylinder than at another edge on the side of the inner cylinder.

8. The cylinder lock of claim 1, wherein the posture maintaining region has a tapered shape in which the driver pin has a largest diameter at an edge on the side of the outer cylinder and gradually decreases in diameter towards the inner cylinder.

9. The cylinder lock of claim 1, wherein a clearance between the communication region and an inner peripheral surface of the hole formed in the inner cylinder is larger than a clearance between the posture maintaining region and an inner peripheral surface of the hole formed in the outer cylinder.

* * * * *